United States Patent [19]

Claxton

[11] 4,179,871
[45] Dec. 25, 1979

[54] SUSPENSION SYSTEM FOR HARVESTER SHAKER MEMBER

[75] Inventor: Gerald L. Claxton, Fresno, Calif.
[73] Assignee: Up-Right, Inc., Berkeley, Calif.
[21] Appl. No.: 878,921
[22] Filed: Feb. 17, 1978
[51] Int. Cl.² .......................................... A01D 46/00
[52] U.S. Cl. .................................................. 56/330
[58] Field of Search ................... 56/330, 331, 328 TS, 56/328 R

[56] References Cited

U.S. PATENT DOCUMENTS

| | | | |
|---|---|---|---|
| 3,187,493 | 6/1965 | Harrett | 56/330 |
| 3,229,453 | 1/1966 | Harrett | 56/330 |

*Primary Examiner*—Russell R. Kinsey
*Attorney, Agent, or Firm*—Phillips, Moore, Weissenberger, Lempio & Majestic

[57] ABSTRACT

A suspension and support system for shaker elements of a mechanical harvester wherein a generally horizontal shaker element support is suspended from the frame of the machine by a pair of generally vertical links pivotally connected at their lower and upper ends respectively to the shaker element support and frame, the links being of unequal length so that the unequal swinging movement of the links relative to the frame will result in a solely horizontal movement of the shaker element which is mounted on the end of the horizontal support member. The pivot connections have no relatively moving, interengaged surfaces so as to prevent sticking of such connections in the event juice accumulates thereon.

10 Claims, 6 Drawing Figures

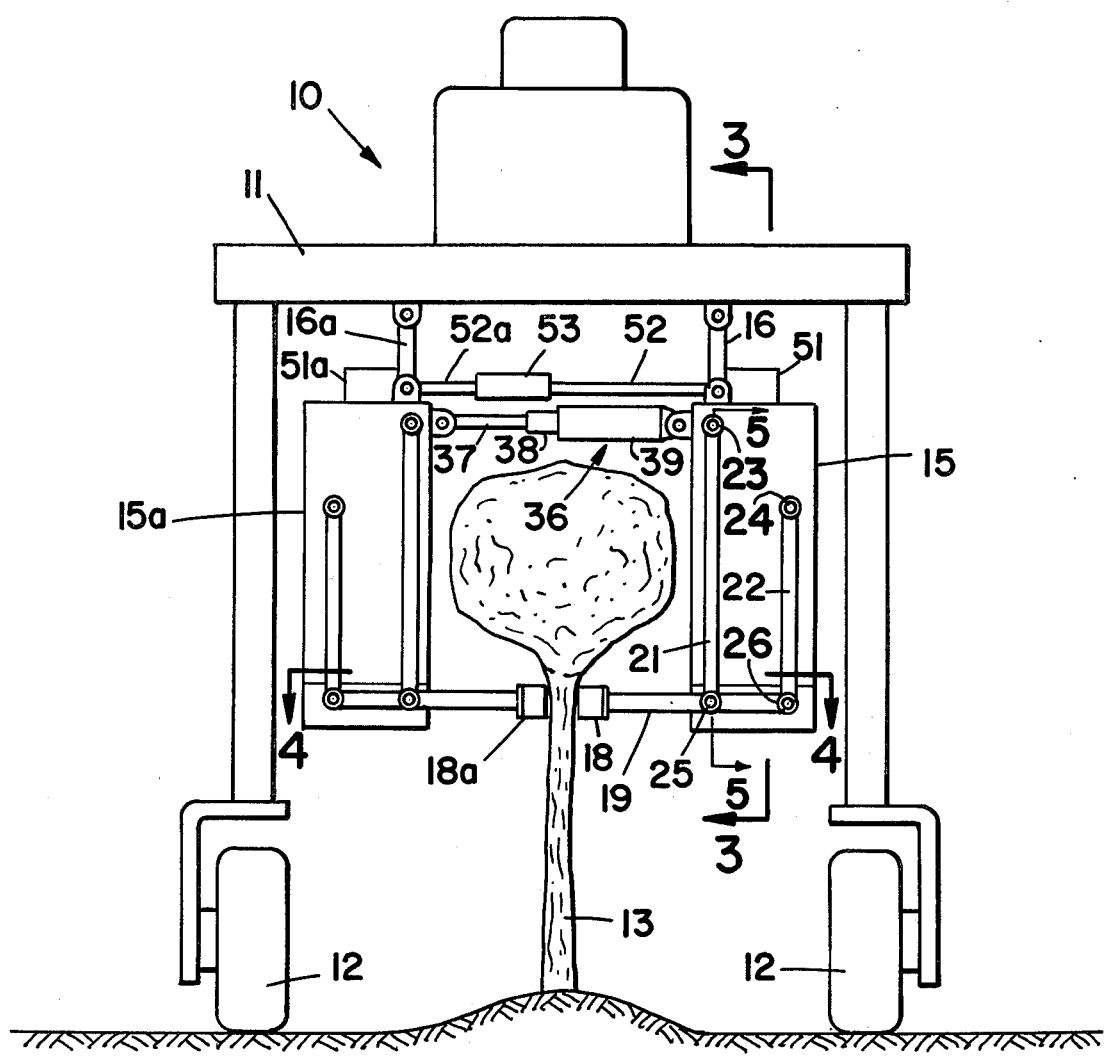
FIG_1
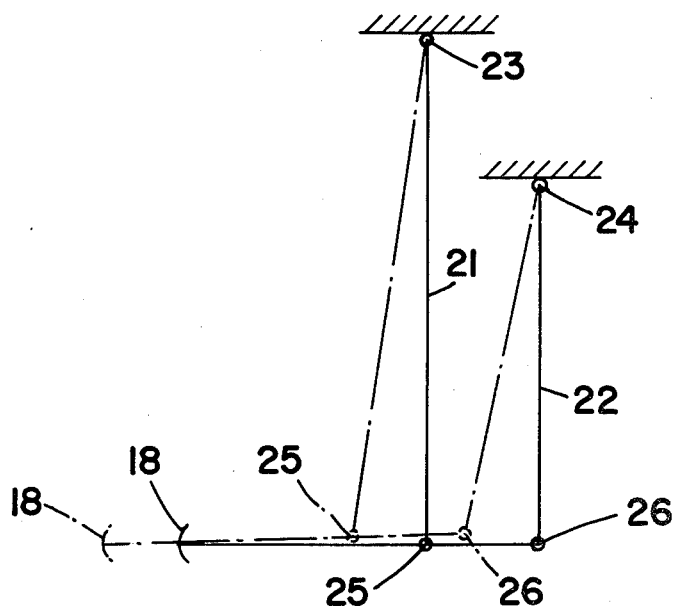
FIG_2

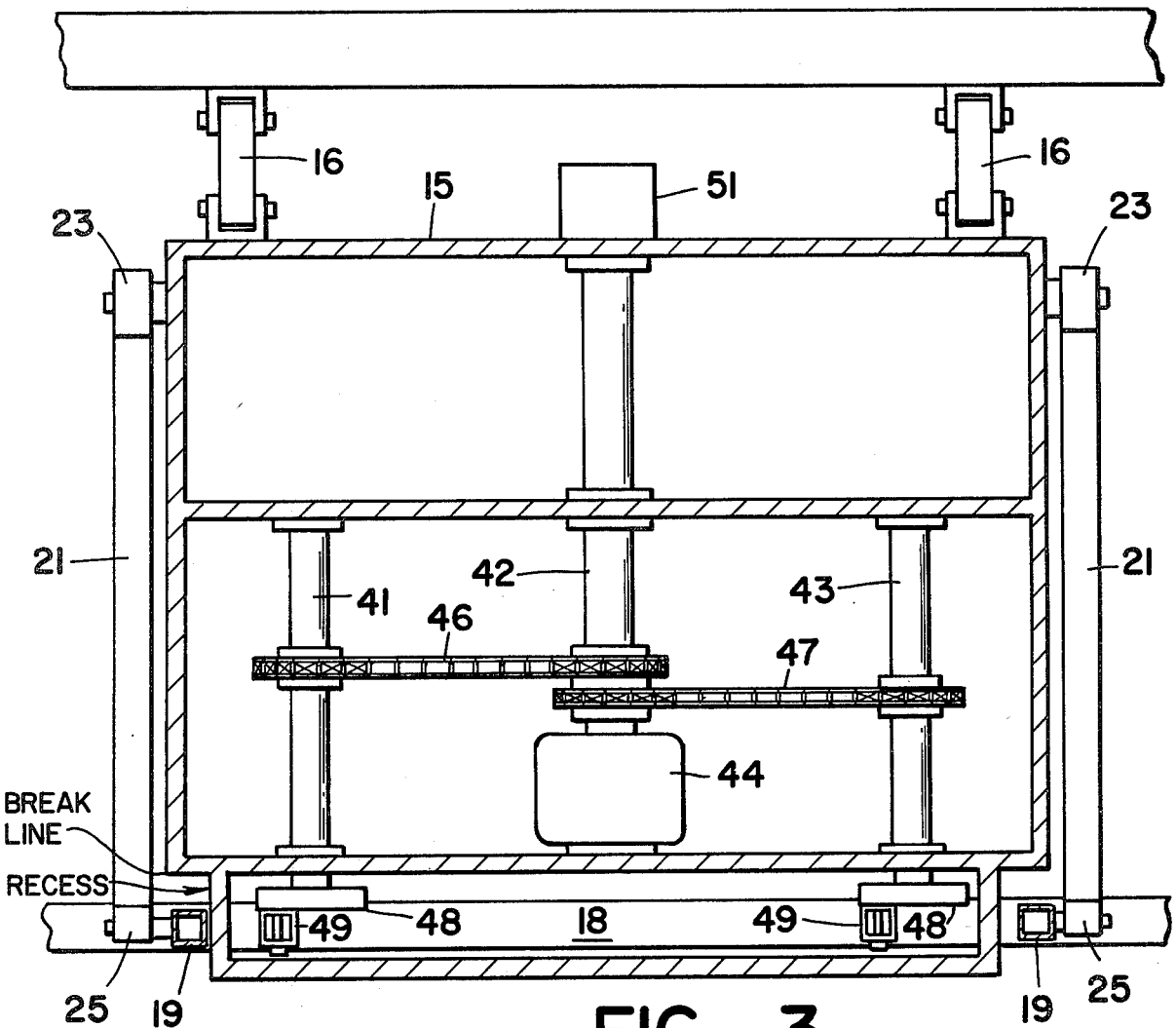
FIG_3
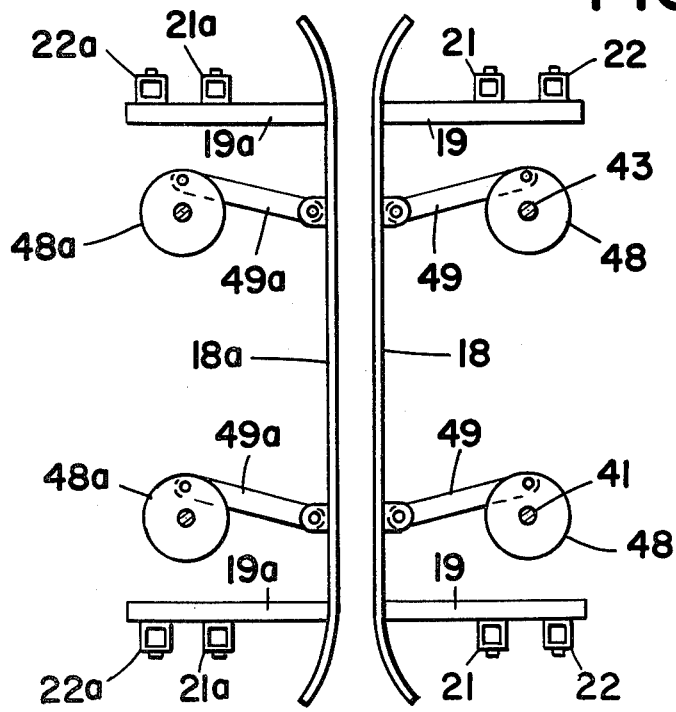
FIG_4

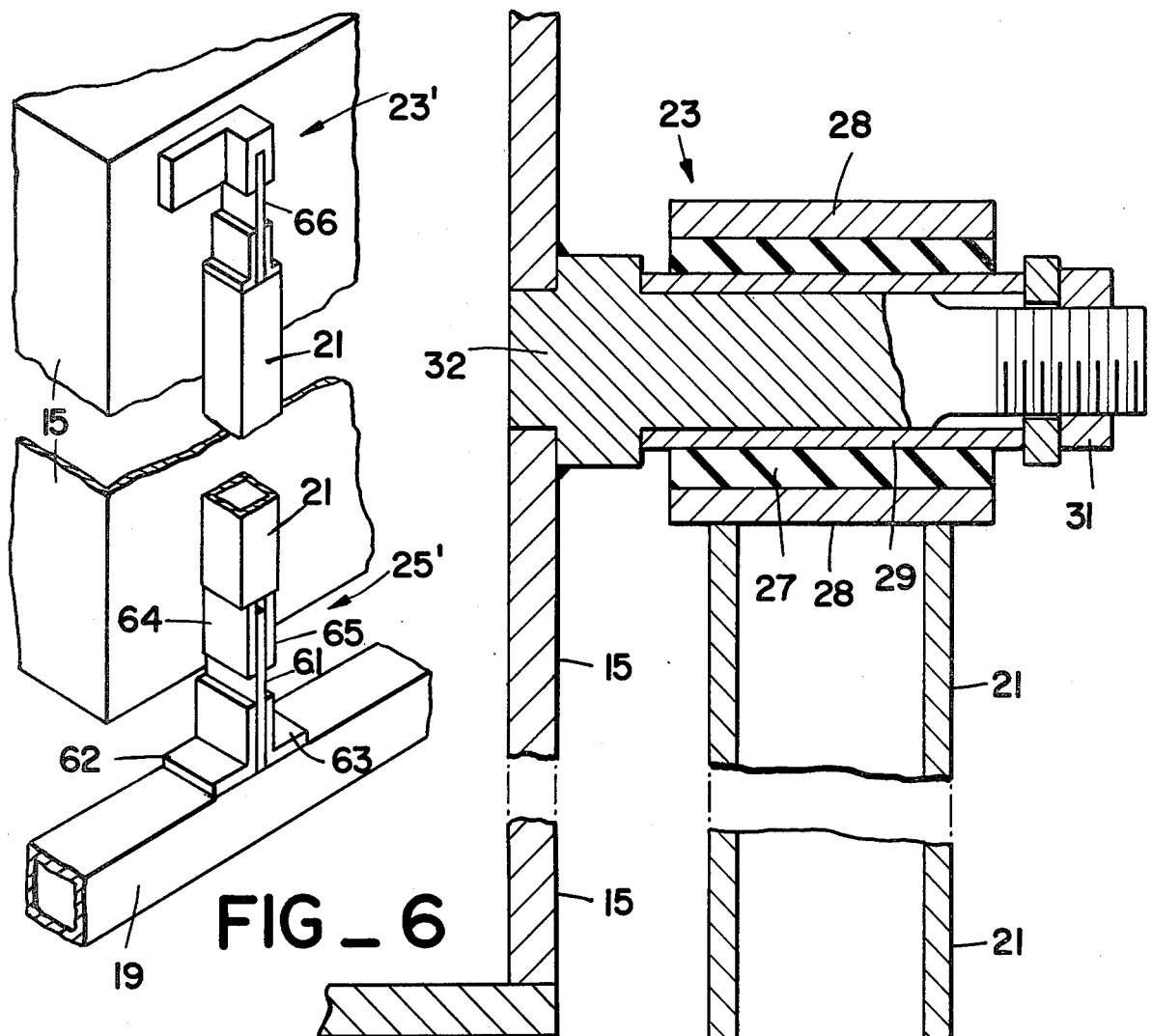
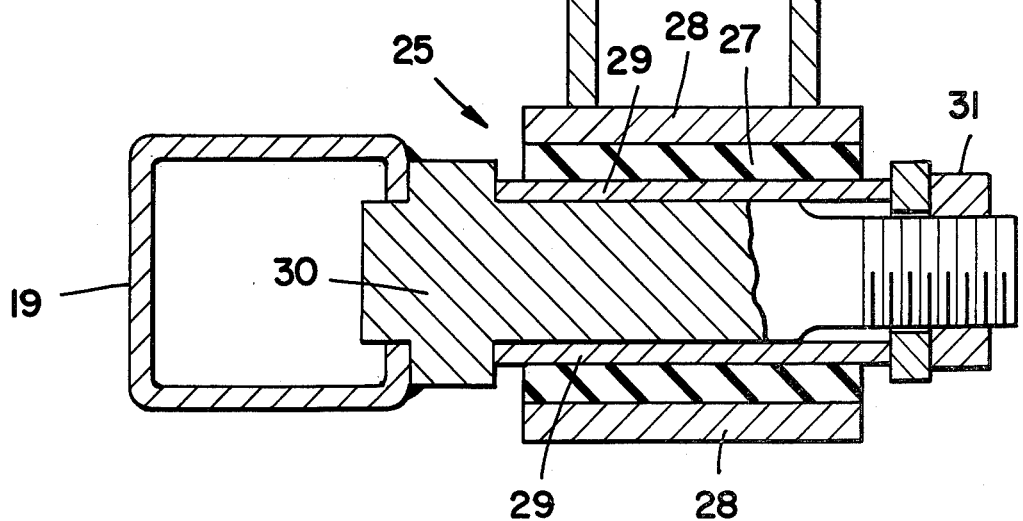
FIG_6
FIG_5

SUSPENSION SYSTEM FOR HARVESTER SHAKER MEMBER

BACKGROUND OF THE INVENTION

This invention relates to apparatus for the mechanical harvesting of grapes and more particularly to the type of harvester having a mobile frame adapted to straddle a plant, the harvester having opposed shaker elements mounted thereon to engage the plant therebetween and having mechanism to reciprocate the shaker elements horizontally back and forth and in unison to shake the plant and cause the ripe fruit thereon to be removed.

In order to protect the plant from undue damage as it is being shaken, the shaker elements should be supported on the frame so that the movement of the shaker elements is confined to a horizontal plane as they are reciprocated. If the shaker elements move vertically as they are reciprocated they will rub up and down on the plant, causing abrasion thereof. It is conventional practice at the present time to mount the shaker members on horizontal support members and to provide elongated horizontal sleeves on the frame in which the support members are telescopically received. Such an arrangement does serve to confine the shaker member supports so that only horizontal movement of the shaker member results. However, it has been found that the telescopic type of shaker support arrangement is not fully satisfactory. In many instances the loading imposed on the shaker element support by the shaker element will have a component transverse to the axis of the support and the sleeve in which it is telescopically secured. Such transverse force component will cause binding between the support and sleeve which results in a decrease in mechanical efficiency and an increase in wear of the support and sleeve.

Another problem with the telescopic type of shaker element support is that if the fruit has a high percentage of juice, as is the case with grapes, juice released from the fruit during harvesting will accumulate on the shaker element support members, and get into the sleeve, causing them to become sticky. As a consequence increased power is required to overcome the drag between relatively moving sticky elements.

It is the principal object of the invention to provide a relatively non-binding support structure for shaker elements which will confine movement of the shaker elements to a horizontal plane. It is a further object to provide such a support which has no interengaged surfaces that move relatively to each other so that relative movement of the support structure elements will not be impeded by an accumulation of sticky juice thereon.

SUMMARY OF THE INVENTION

The principal object of the invention is achieved by mounting the shaker elements on generally horizontal support members and by suspending the support members from the frame by a pair of suspension members which pivot relative to the frame and to the horizontal support members. The suspension members are of unequal length so that as the support member moves in a generally axial direction, the support member will change its inclination to horizontal, but the shaker element mounted on the end thereof will travel only in a horizontal plane.

The further object of the invention is achieved by using flexible members, such as elastomeric bearings or straps, to pivotally connect the suspension members to the frame and to the shaker element support members. Such connection allows the desired swinging movement of the support members relative to the frame to occur without having such movement impeded by an accumulation of juice on the connections.

BRIEF DESCRIPTION OF THE DRAWINGS

In the drawings forming a part of this application, and in which like parts are designated by like reference numerals throughout the same, FIG. 1 is an elevational and simplified end view of a harvesting machine constructed in accordance with the invention;

FIG. 2 is a diagram illustrating the shaker element support and suspension system;

FIG. 3 is a sectional view of one of the drive mechanisms of the machine, taken on line 3—3 of FIG. 1;

FIG. 4 is a sectional view of the shaker elements of the machine, taken on line 4—4 of FIG. 1;

FIG. 5 is a sectional view taken on line 5—5 of FIG. 1 and on an enlarged scale illustrating the details of the pivotal connections of one of the suspension members;

FIG. 6 is a perspective view, and on an enlarged scale relative to FIGS. 1 and 3, of a modification of the pivotal connections of one of the suspension members.

DESCRIPTION OF THE PREFERRED EMBODIMENTS

Referring now to the drawings, FIGS. 1-5 disclose one form of mechanical harvester constructed in accordance with the invention.

The harvester 10 comprises a generally inverted-U-shaped frame 11 having wheels 12 at the four corners thereof, the harvester being adapted to straddle and move along a row of plants 13.

A sub-frame 15 is suspended from one side of the main frame 11 by links 16 at front and rear thereof so that the sub-frame 15 may move transversely to the longitudinal centerline of the harvester. A mirror-image sub-frame 15a is similarly suspended from the main frame on the other side thereof. Elements associated with sub-frame 15a which correspond to like elements of sub-frame 15 are designated by the same reference numerals, with an "a" appended thereto.

A shaker element 18, as for example in the form of an elongated horizontal rail having outwardly curved ends, is mounted on the inner ends of a pair of horizontal and tubular support members 19, each support member 19 extending transversely of the harvester and being suspended from sub-frame 15 by a pair of tubular suspension members 21 and 22. Pivotal connections 23 and 24 connect the upper ends of suspension members 21 and 22, respectively, to sub-frame 15, while pivotal connections 25 and 26 connect the lower ends thereof to the horizontal support member 19 associated therewith. The suspension member 21 which is closer to the longitudinal centerline of the harvester is longer than member 22 so that as the support member 19 moves back and forth transversely to the centerline, the shaker rail 18 will remain at a substantially constant height above the ground.

As will be seen from the diagram of FIG. 2, when support member 19 moves from its full to its dotted-line position, pivot points 25 and 26 will move through arcuate paths having radii of curvature equal to the distance between the upper and lower pivotal connections of suspension members 21 and 22 respectively.

Since member 22 is shorter than member 21, the degree of the vertical component of movement of pivot point 26 will be greater than that of pivot point 25. As a consequence, as support member 19 moves towards the dotted-line position, its inclination will increase so that the shaker rail 18 stays at a fixed height.

In order to convert the swinging motion of suspension members 21 and 22 into only a substantially horizontal movement of shaker rail 18, the ratio of the lengths of members 21 and 22 should be equal to the ratio of the distances from shaker rail 18 to pivot points 26 and 25 respectively. Normally, the distance from shaker rail 18 to pivot point 25 is dictated by the overall width of the harvester and the distance between pivot points 25 and 26 is limited by the width of sub-frame 15. Suspension member 21 is preferably made as long as convenient, its length being limited by the vertical distance between the upper end of sub-frame 15 and support member 19. With these dimensions being selected, the length of the shorter suspension member 22 may then be determined so that the proper length ratio between members 21 and 22 is obtained.

As more fully disclosed in FIG. 5, the pivotal connection 25 between the vertical suspension member 21 and the horizontal shaker element support member 19 comprises a cylindrical elastomeric bushing 27 having its outer and inner cylindrical surfaces bonded by a suitable glue to the outer and inner sleeves 28 and 29, respectively. Outer sleeve 28 is fixed to the lower end of suspension member 21, while inner sleeve 29 is fixed to the support member 19 by means of bolt 30 which is welded or otherwise fixed to member 19. As nut 31 is tightened, both of the protruding ends of the inner sleeve 29 will be clamped rigidly to bolt 30.

Such a connection allows a limited, but sufficient, amount of pivotal movement between members 19 and 21, relative to the horizontal axis of the connection 25, by virtue of the torsional flexure of the elastomeric bushing 27 even though such bushing is bonded to sleeves 28 and 29. Since there are no interengaging surfaces which slide or otherwise move relative to each other, the pivotal movement of the connection will not be affected even though juices may accumulate thereon. The length of the bushing 27 is considerably greater than the wall thickness thereof so that the connection has a structural rigidity to resist a horizontal component of force on the support member 19 transverse to the longitudinal axis thereof. The existence of such a force will have very little effect on the torsional flexure capabilities of the connection so that the members 19 and 21 can pivot easily about the axis of the connection even though bolt 30 is being subjected to a twisting force relative to the axis of the suspension member 21.

The pivotal connection 23 between the upper end of suspension member 21 and sub-frame 15 is the same as just described, with bolt 32 being fixed to sub-frame 15 and with the protruding ends of the inner sleeve 29 of this connection being clamped tightly to bolt 32.

Pivotal connections 24 and 26 are the same as connections 23 and 25, respectively.

A hydraulic cylinder 36 interconnects the sub-frames 15 and 15a, the rod 37 of the cylinder having an adjustable stop member in the form of a collar 38 mounted thereon and fixed thereto. When pressure is applied to the rod end of the cylinder the rod will move to the right until the collar 38 engages the cylinder housing 39 to set the minimum horizontal spacing between the rails 18 and 18a. If the thickness of the plant engaged by the rails exceeds this minimum setting the rails will spread apart when the outward force exerted thereon is sufficient to overcome the hydraulic force in the cylinder. As is conventional, the location of the collar 38 on rod 37 may be changed to vary the minimum spacing between the rails.

The shaker elements 18 and 18a are reciprocated in a manner as shown in FIGS. 3 and 4. Sub-frame 15 has three vertical shafts 41, 42 and 43 journaled therein, shaft 42 being driven by hydraulic motor 44, such drive being transmitted by chains 46 and 47 to shafts 41 and 43 respectively. Each shaft 41 and 43 has a flywheel 48 fixed to the lower end thereof. Drive links 49, each having one end pivotally connected to rail 18 and the other end eccentrically connected to one of the flywheels, convert the rotary motion of the flywheels to reciprocal movement of rail 18.

The rotation of main shaft 42 is transmitted through the right-angle drive unit 51 to shaft 52, telescopic drive connection 53, shaft 52a and right-angle drive unit 51a to the hydraulic motor-driven main shaft of sub-frame 15a so that the transverse motion of rails 18 and 18a is synchronized, with rail 18 being moved towards the longitudinal centerline of the machine, while rail 18a is moved away therefrom, and vice versa.

In operation, the overall height of harvester 10 is adjusted (by conventional means not shown) so that the shaker rails 18 and 18a will engage the plant 13 at a desired height thereon. The harvester is driven into straddling relation with the plant and the shaker rails are reciprocated with an amplitude and at a rate to shake the plant and dislodge the fruit therefrom. As brought out previously, as the shaker rails are reciprocated, the pivotal movements of the suspension links relative to the sub-frame and to the shaker element supports 19 will cause the inclination of the supports 19 to vary, but the shaker rails themselves will have no component of vertical movement. Accordingly, the plant is not subjected to vertical abrasion by the rails during shaking. If desired, the harvester may be driven forwardly during the shaking operation so that the shaker members slide horizontally along the plant. The rails are smooth-surfaced and little abrasion to the plant is caused by such forward movement.

FIG. 6 illustrates a modified pivotal connection 25'. In this modification, a strap 61 is used, the strap being, for example, a section of reinforced flexible belting. Such strap is vertically oriented and transverse to the axis of support member 19, the strap having its lower edge and vertical surfaces adjacent thereto secured to brackets 62 and 63 on support member 19 and having its upper edge and vertical surfaces adjacent thereto secured to depending and opposed legs 64 and 65 on the lower end of suspension member 21. As before, the flexure of the unconfined portion of strap 61 between the confined upper and lower surfaces thereof will allow the desired pivotal movement of members 19 and 21 to occur without any impedance to such movement because of juice accumulation. The strap has a width substantially greater than the height of the unconfined mid-portion thereof to provide resistance against twisting of the support member 19 relative to the suspension member 21. The upper pivotal connection 23' utilizes a similar strap belting section 66, similarly connected to the suspension member 21 and sub-frame 15 to allow pivotal movement of the member relative to the sub-frame.

What is claimed is:

1. A harvesting machine comprising:
   (a) a mobile inverted-U-shaped frame adapted to move longitudinally onto and straddle a plant,
   (b) a pair of opposed shaker elements disposed generally at the longitudinal centerline of said frame,
   (c) an elongated and generally horizontal support member associated with each of said shaker elements, each support member extending generally transverse of said frame and having opposed ends one of which is fixed to the shaker member with which it is associated and the other of which is spaced from said shaker element outwardly from said longitudinal centerline of said frame,
   (d) a pair of elongated and generally vertical suspension members operatively associated with each of said support members, the first suspension member of each pair being longer than the second member of each pair,
   (e) means pivotally connecting the upper end of the first suspension member of each pair to said frame and pivotally connecting the lower end of said first suspension member to an intermediate point on the support member with which said first suspension member is associated,
   (f) means pivotally connecting the upper end of the second suspension member of each pair to said frame and pivotally connecting the lower end of said second suspension member to said other end of the support member with which said second suspension member is associated,
   (g) means for reciprocating said opposed shaker elements in unison and transversely of said frame.

2. A harvesting machine as set forth in claim 1 wherein each means pivotally connecting the lower end of a suspension member to a support member comprises a flexible member having spaced-apart surfaces, one of which surfaces is fixed to said suspension member and the other of which surfaces is fixed to said support member.

3. A harvesting machine as set forth in claim 2, wherein the length of said surfaces is substantially greater than the distance between said surfaces.

4. A harvesting machine as set forth in claim 2 wherein said flexible member comprises an elastomeric bushing and wherein said spaced-apart surfaces of said member comprise the inner and outer cylindrical surfaces thereof.

5. A harvesting machine as set forth in claim 4 wherein the length of said bushing is substantially greater than the distance between said inner and outer surfaces thereof.

6. A harvesting machine as set forth in claim 2 wherein said resiliently deformable member comprises a vertically disposed flexible strap and wherein said spaced-apart surfaces of said strap comprise upper and lower vertical surfaces adjacent the upper and lower edges of said strap.

7. A harvesting machine as set forth in claim 6 wherein the width of said strap is substantially greater than the vertical distance between said upper and lower surfaces.

8. A harvesting machine as set forth in claim 1, wherein for each support member and pair of suspension members associated therewith, the ratio of the length of said first suspension member to the length of said second suspension member is substantially equal to the ratio of the distance from said shaker element to the connection of said support member and said second suspension member to the distance from said shaker element to the connection of said support member and said first suspension member.

9. A harvesting machine as set forth in claim 8 wherein each means pivotally connecting the lower end of a suspension member to a support member comprises a flexible member having spaced-apart surfaces, one of which surfaces is fixed to said suspension member and the other of which surfaces is fixed to said support member.

10. A harvesting machine as set forth in claim 9, wherein the length of said surfaces is substantially greater than the distance between said surfaces.

* * * * *